United States Patent
Lim

(10) Patent No.: US 9,381,688 B2
(45) Date of Patent: Jul. 5, 2016

(54) ANTENNA PATTERN FRAME HAVING ANTENNA PATTERN EMBEDDED THEREIN, ELECTRONIC DEVICE INCLUDING THE SAME, METHOD AND MOLD FOR MANUFACTURING THE SAME

(71) Applicant: SAMSUNG ELECTRO-MECHANICS CO., LTD., Suwon, Gyunggi-do (KR)

(72) Inventor: Dae Ki Lim, Gyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 210 days.

(21) Appl. No.: 14/039,774

(22) Filed: Sep. 27, 2013

(65) Prior Publication Data

US 2014/0168017 A1 Jun. 19, 2014

(30) Foreign Application Priority Data

Dec. 14, 2012 (KR) ........................ 10-2012-0146588

(51) Int. Cl.
| | |
|---|---|
| H01Q 1/22 | (2006.01) |
| B29C 45/14 | (2006.01) |
| H01Q 1/12 | (2006.01) |
| H01Q 1/24 | (2006.01) |
| H01Q 1/40 | (2006.01) |
| B29L 31/34 | (2006.01) |

(52) U.S. Cl.
CPC ..... *B29C 45/14065* (2013.01); *B29C 45/14639* (2013.01); *H01Q 1/1207* (2013.01); *H01Q 1/243* (2013.01); *H01Q 1/40* (2013.01); *B29L 2031/3437* (2013.01)

(58) Field of Classification Search
CPC ........... H01Q 1/40; H01Q 1/243; H01Q 1/22; H01Q 1/1207; B29C 45/14065
USPC .......................... 343/702, 700 MS, 873, 872
See application file for complete search history.

(56) References Cited

U.S. PATENT DOCUMENTS

| | | | | |
|---|---|---|---|---|
| 8,068,067 | B2 * | 11/2011 | Hong | ................... H01Q 1/1207 343/702 |
| 8,773,314 | B2 * | 7/2014 | Hong | .................. B29C 45/1671 343/702 |
| 2011/0205141 | A1 | 8/2011 | Hong et al. | |

FOREIGN PATENT DOCUMENTS

| | | |
|---|---|---|
| KR | 10-0932079 B1 | 12/2009 |
| KR | 2011-0097415 A | 8/2011 |

* cited by examiner

*Primary Examiner* — Hoang V Nguyen
(74) *Attorney, Agent, or Firm* — NSIP Law

(57) ABSTRACT

An antenna pattern frame having an antenna pattern embedded therein, an electronic device including the same, a method of manufacturing the same, and a mold for manufacturing the same. The antenna pattern frame includes a radiator including an antenna pattern part transmitting or receiving a signal and a terminal connection portion electrically connecting the antenna pattern part and a circuit substrate; a radiator frame formed by injection-molding to incorporate the radiator so that the terminal connection portion is exposed at a first surface of the radiator frame and the antenna pattern part is exposed at and protrudes from a second surface of the radiator frame opposite to the first surface; and a cover frame injection-molded so that the antenna pattern part is embedded between the radiator frame and the cover frame.

7 Claims, 9 Drawing Sheets

ANTENNA PATTERN FRAME HAVING ANTENNA PATTERN EMBEDDED THEREIN, ELECTRONIC DEVICE INCLUDING THE SAME, METHOD AND MOLD FOR MANUFACTURING THE SAME

CROSS-REFERENCE TO RELATED APPLICATION

This application claims the benefit of Korean Patent Application No. 10-2012-0146588 filed on Dec. 14, 2012, with the Korean Intellectual Property Office, the disclosure of which is incorporated herein by reference.

BACKGROUND OF THE INVENTION

1. Field of the Invention

The present invention relates to an antenna pattern frame having an antenna pattern embedded therein, an electronic device including the same, a method of manufacturing the same, and a mold for manufacturing the same.

2. Description of the Related Art

Mobile communications terminals, for example, cellular phones, PDAs, navigation devices, notebook computers, and the like, supporting wireless communications, are necessities in modern society. Mobile communications terminals use various communications schemes, such as CDMA, wireless LAN, GSM, DMB, or the like. One of the most important elements of mobile communications terminals that enable these functions is an antenna.

Antennas currently used in mobile communications terminals have evolved from exterior type antennas, such as rod antennas and helical antennas, to an interior type antenna mounted within the terminal.

There have been problems, in that the exterior type antenna may be vulnerable to external impacts, while the interior type antenna increases the volume of the terminal itself.

In order to solve these problems, research into integrating the antenna with the mobile communications terminal has been actively conducted.

According to the related art, a method in which a radiator frame is formed by injection-molding a radiator and the radiator is embedded within a case of an electronic device by reinjecting the radiator frame has been used.

In order for the radiator to be accurately embedded in the case of the electronic device, a unit for fixing the radiator to a mold needs to be provided. However, according to the related art, the radiator has typically been fixed to the mold by a pin or the like provided in the mold by providing holes in the radiator. However, according to the related art, the radiator has been typically fixed to the mold by a pin or the like provided in the mold by providing holes or the like in the radiator. However, according to the above-mentioned technology, holes or the like formed in the antenna pattern itself may have an effect on characteristics of the radiator and an exterior of the case may have depressions therein due to the holes or the like.

In addition, in a case of electronic devices manufactured using the above-mentioned method, since the antenna pattern is embedded in an approximately intermediate part of the case, performance of an antenna may be somewhat degraded.

In addition, in the case in which the antenna radiator is directly embedded in the case of the electronic device, the antenna radiator and the radiator frame in their entirety should be discarded when problems during the manufacturing of the case of the electronic device are generated, regardless of the manufacturing of the antenna radiator.

The following related art document discloses a case structure of an electronic device formed by providing holes or the like in the radiator, fixing the radiator in the mold using the pin or the like, and then injection-molding the radiator.

RELATED ART DOCUMENT

Korean Patent Laid-Open Publication No. 10-2011-0097415

SUMMARY OF THE INVENTION

An aspect of the present invention provides a method capable of embedding an antenna radiator in a case of an electronic device while allowing a form thereof to be maintained without deformations of the antenna radiator itself, such as holes or the like.

Another aspect of the present invention provides a radiator frame and an antenna pattern frame manufactured by the method.

Another aspect of the present invention provides a method capable of molding an antenna pattern part to be partialized from an internal part of the antenna pattern frame outwardly thereof so that the antenna pattern part may significantly exhibit performance of the radiator.

In addition, another aspect of the present invention provides an antenna pattern frame capable of being mounted in the case by manufacturing the antenna pattern frame separately from the case of the electronic device.

According to an aspect of the present invention, there is provided an antenna pattern frame, including: a radiator including an antenna pattern part transmitting or receiving a signal and a terminal connection portion electrically connecting the antenna pattern part and a circuit substrate; a radiator frame formed by injection-molding to incorporate the radiator so that the terminal connection portion is exposed at a first surface of the radiator frame and the antenna pattern part is exposed at and protrudes from a second surface of the radiator frame opposite to the first surface; and a cover frame injection-molded to incorporate the radiator so that the antenna pattern part is embedded between the radiator frame and the cover frame.

A thickness of the cover frame from an outer surface of the cover frame to the antenna pattern part may be less than that of the cover frame from an outer surface thereof to the radiator frame other than the portion having the antenna pattern part.

A thickness of the cover frame from an outer surface of the cover frame to the radiator frame other than the portion having the antenna pattern part may be the same as a thickness of the radiator frame other than the portion having the antenna pattern part.

The second surface of the radiator frame may be provided in a form stepped in a direction of the first surface, from the portion having the antenna pattern part to other portions.

The first surface of the cover frame may be provided in a form stepped in a direction of the second surface, from portions other than the portion having the antenna pattern part to the portion having the antenna pattern part.

One surface of the cover frame may be further provided with a film formed by performing coating or painting, or attaching a film or a coating paper.

According to another aspect of the present invention, there is provided an electronic device, including: a case of the electronic device; the antenna pattern frame described above mounted on the case of the electronic device; and a circuit substrate electrically connected to the terminal connection portion to receive or transmit a signal from or to the radiator.

According to another aspect of the present invention, there is provided a mold for manufacturing a radiator frame, including: an upper mold configured to receive a radiator having an antenna pattern part and a terminal connection portion disposed in different planes; a lower mold combinable with the upper mold to form an internal space to receive the radiator; and a resin material injection part provided with at least one of the upper mold and the lower mold through which a resin material can be introduced into the internal space; wherein an internal surface of the upper mold has an insertion groove configured to receive the antenna pattern part.

The insertion groove may have a depth greater than a thickness of the antenna pattern part.

The antenna pattern part may be adhered to the internal surface of the upper mold and the terminal connection portion may be adhered to the lower mold.

The antenna pattern part may be seated in the insertion groove and the terminal connection portion may be adhered to the lower mold.

According to another aspect of the present invention, there is provided a method of manufacturing an antenna pattern frame, the method including: providing a radiator having an antenna pattern part and a terminal connection portion disposed in different planes; disposing the radiator in an internal space of a manufacturing mold, the internal space formed by combining an upper mold and a lower mold, the upper mold having an insertion groove into which the antenna pattern part is inserted; and injecting a resin material into the internal space through a resin material injection part formed in the manufacturing mold to form a radiator frame so that the terminal connection portion is exposed at a first surface of the radiator frame and the antenna pattern part is exposed at and protrudes from a second surface of the radiator frame opposite to the first surface.

The method may further include, after the forming of the radiator frame, forming a cover frame by injection-molding so that the antenna pattern part is embedded between the radiator frame and the cover frame by covering one surface of the radiator frame.

The insertion groove may have a depth greater than a thickness of the antenna pattern part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
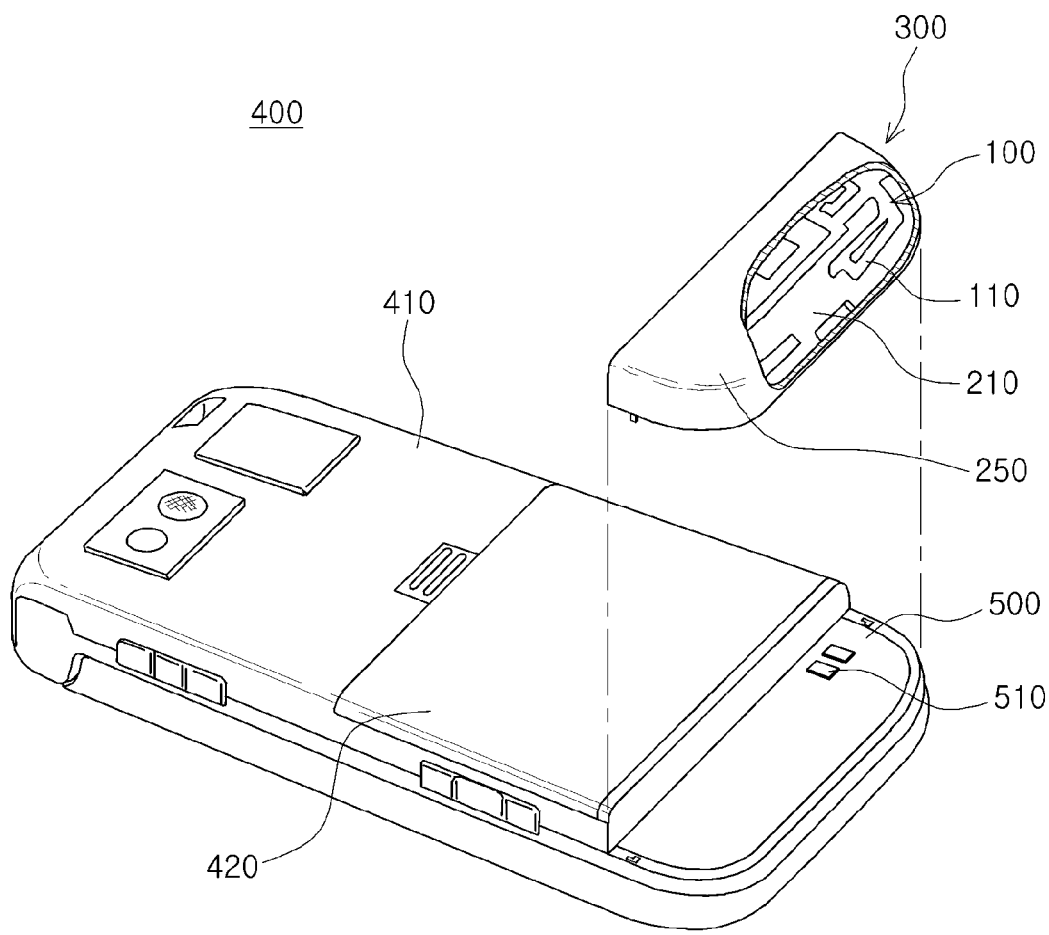
FIG. 1 is a perspective view schematically showing by partially cutting an antenna pattern frame, in a form in which the antenna pattern frame is coupled to a case of a mobile communications terminal, an electronic device, according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 2:
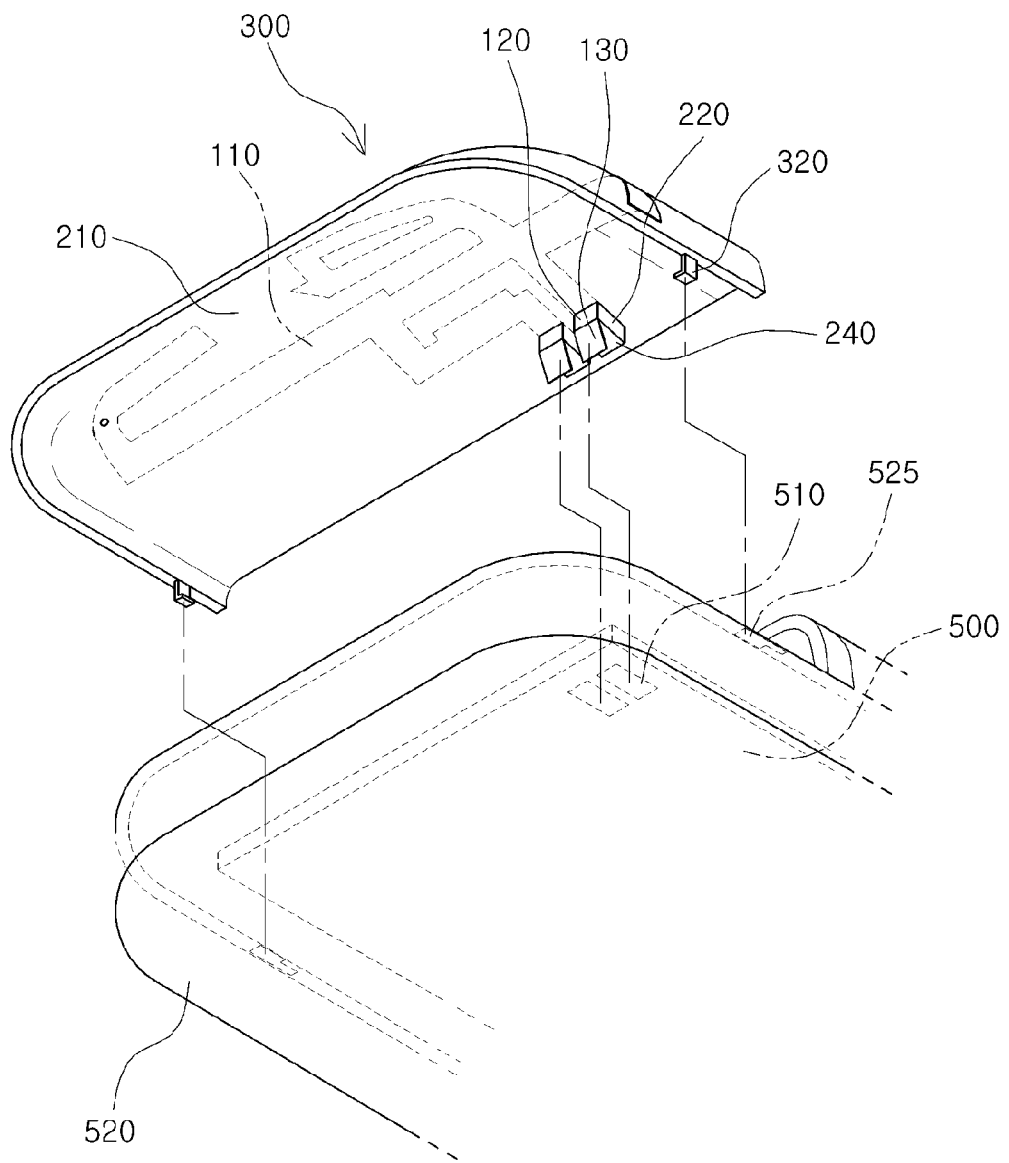
FIG. 2 is a perspective view schematically showing an exploded form of the mobile communications terminal manufactured using the antenna pattern frame according to an embodiment of the present invention.

FIG. 1 is a perspective view schematically showing by partially cutting an antenna pattern frame, in a form in which the antenna pattern frame is coupled to a case of a mobile communication terminal, an electronic device, according to an embodiment of the present invention and FIG. 2 is a perspective view schematically showing an exploded form of the mobile communication terminal manufactured using the antenna pattern frame according to an embodiment of the present invention.

Referring to FIGS. 1 and 2, an antenna pattern frame 300 in which a radiator 100 including an antenna pattern part 110 is embedded may be mounted in a case 410 of a mobile communication terminal 400, an electronic device according to an embodiment of the present invention.

The antenna pattern frame 300 may be formed by embedding the antenna pattern part 110 between a molded frame 210 and a cover frame 250.

Here, the radiator 100 may include a terminal connection portion 130 for connection to a terminal 510 of a circuit substrate 500 and the antenna pattern frame 300 mounted on the case 410 of the electronic device may implement antenna performance in the mobile communication terminal 400 by connecting the terminal connection portion 130 to the terminal 510 of the circuit substrate 500.

Here, the terminal connection portion 130 may be in elastic contact with the terminal 510 in order to secure connection reliability to the terminal 510.

In addition, at least one side of the antenna pattern frame 300 having the antenna pattern embedded therein may be provided with a fastening part 320 for fastening to a main case 520 forming an exterior of the mobile communication terminal 400, the electronic device.

For example, the fastening part 320 is protruded from one side of the antenna pattern frame 300 having the antenna pattern embedded therein and the main case 500 includes a fastening line groove 525 corresponding to the fastening part 320, such that the fastening part 320 may be inserted and slid into the fastening line groove 525 to be fastened thereto. However, the fastening part 320, protrudedly formed, may be formed in the main case 520 and the fastening line groove 525 may be formed in the case 300 of the electronic device having the antenna pattern embedded therein, such that the fastening part 320 may also be slidably fastened to the fastening line groove 525. Of course, a fastening method is not limited thereto.

Figure 3:
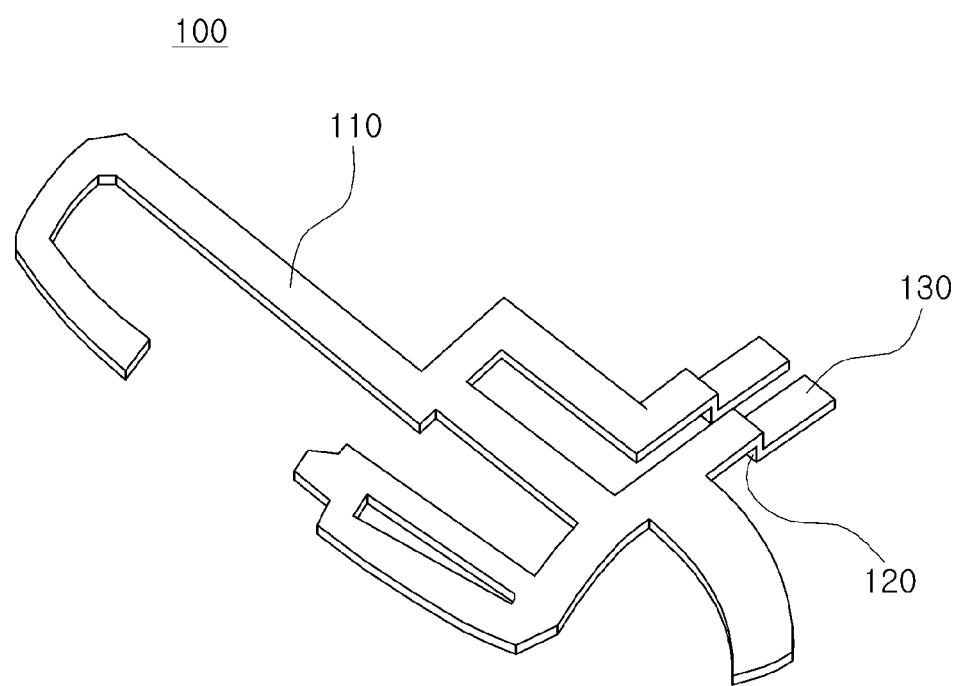
FIG. 3 is a perspective view schematically showing a radiator provided with the antenna pattern frame according to an embodiment of the present invention.

Radiator Frame, Mold for Manufacturing Thereof, and Method of Manufacturing Thereof FIG. 3 is a perspective view schematically showing a radiator provided with the antenna pattern frame according to an embodiment of the present invention.

The radiator frame 200 may be manufactured by injection-molding the radiator 100 and the radiator 100 provided on the radiator frame 200 may include the antenna pattern part 110 for transmitting or receiving a signal and the terminal connection portion 130 for transmitting the signal to or receiving the signal from the circuit substrate 500 of the electronic device.

Referring to FIG. 3, the radiator 100 provided on the radiator frame 200 according to the embodiment of the present invention may include the antenna pattern part 110, the connection part 120, and the terminal connection portion 130.

The radiator 100 may be configured of a conductor formed of, for example, aluminum, copper, or the like, and may receive an external signal and transfer the received external signal to a signal processing device of the electronic device such as the mobile communication terminal 400. In addition, the radiator 100 may include the antenna pattern part 110 forming a meander line for receiving an external signal within various bands.

The radiator 100 may include the antenna pattern part 110 receiving the external signal and the terminal connection portion 130, in contact with the circuit substrate 500 of the electronic device in order to transmit the external signal to the electronic device.

In addition, the radiator 100 may be formed as a three-dimensional structure by respectively bending the antenna pattern part 110 and the terminal connection portion 130 and the antenna pattern part 110 and the terminal connection portion 130 may be connected to each other by the connection part 120. The connection part 120 may connect the antenna pattern part 110 and the terminal connection portion 130 so that the antenna pattern part 110 is formed on one surface of the molded frame 210 and the terminal connection portion 130 is formed on the other surface of the molded frame 210.

The connection part 120 may allow the antenna pattern part 110 and the terminal connection portion 130 to be configured on different planes and may allow the terminal connection portion 130, not embedded in the antenna pattern frame 300, to be exposed to a surface opposite to one surface having the antenna pattern part 110 formed thereon.

Here, the terminal connection portion 130 may transmit the signal received from the antenna pattern part 110 to the circuit substrate 500 of the electronic device and may be in elastic contact with the terminal 510 of the circuit substrate 500 in order to secure reliability of signal transmission.

Therefore, the terminal connection portion 130 may have a configuration for securing elastic force added thereto. That is, in order to perform the injection-molding of the case 300 of the electronic device having the antenna pattern embedded therein and then provide elasticity to the terminal connection portion 130, the terminal connection portion 130 is bent by applying external force thereto. In this case, the elastic force of the terminal connection portion 130 may be secured by forming a reinforcing part (not shown) such as a reinforcement emboss formed by applying pressure from one surface to the other surface at a boundary between the connection part 120 and the terminal connection portion 130.

In addition, by the reinforcing part (not shown), the boundary between the connection part 120 and the terminal connection portion 130 may be further reinforced and may prevent the terminal connection portion 130 from being damaged by external impacts.

Here, the reinforcing part (not shown) may be a reinforcement bead protrudedly formed at the boundary between the connection part 120 and the terminal connection portion 130, or may form the boundary between the connection part 120 and the terminal connection portion 130 in a rounded manner.

However, the reinforcing part (not shown) is not limited to the above-mentioned reinforcement bead or the boundary formed in the rounded manner, but may be changed as long as it may secure elastic force in the terminal connection portion 130 and prevent damage to the terminal connection portion 130 due to the external force.

Figure 4:
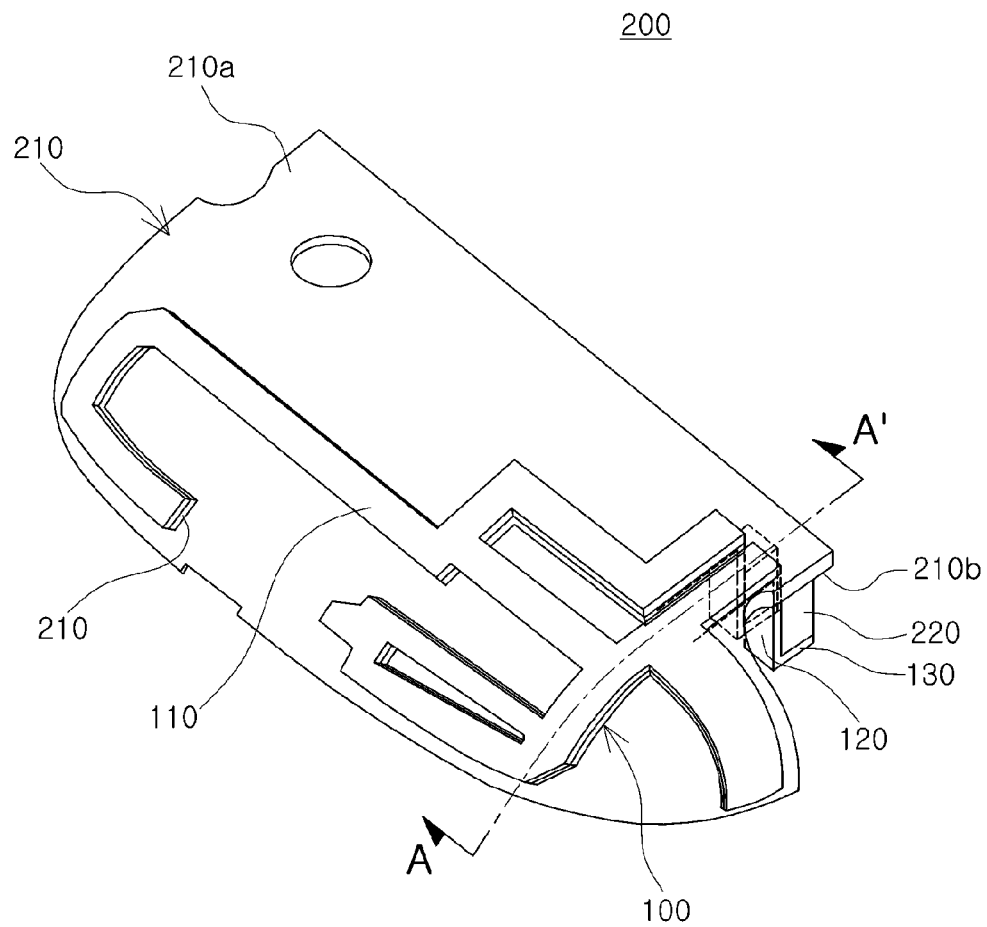
FIG. 4 is a perspective view schematically showing the radiator frame according to an embodiment of the present invention.
Figure 5:
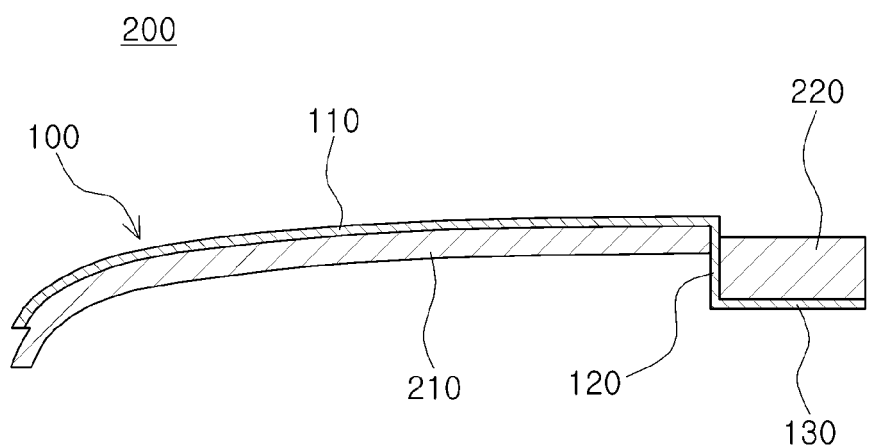
FIG. 5 is a schematic cross-sectional view taken along line A-A' of FIG. 4.
Figure 6:
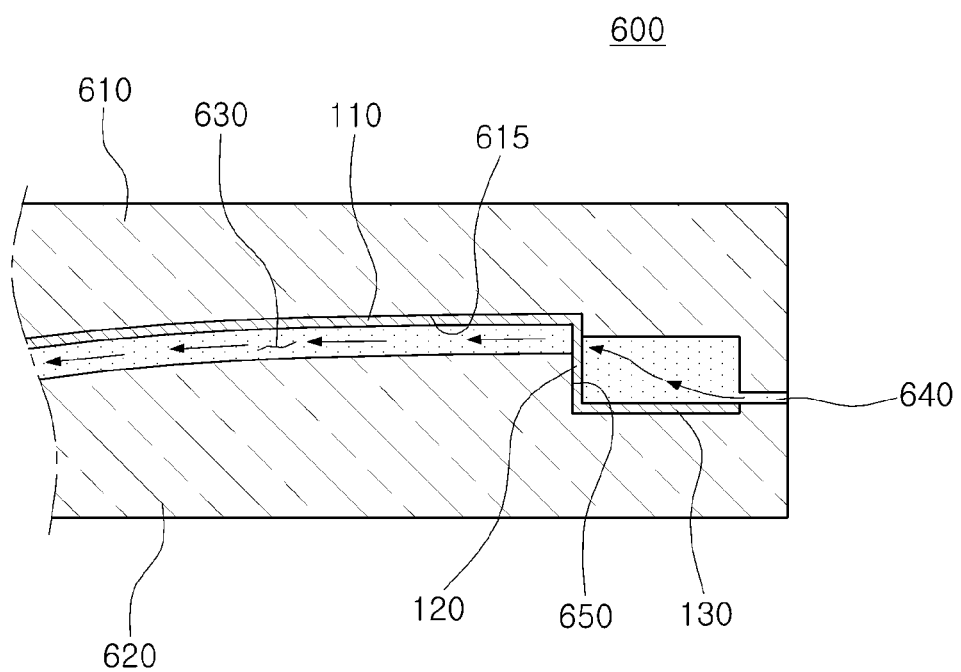
FIG. 6 is a cross-sectional view schematically showing a form in which a resin material is filled in a mold for manufacturing the radiator frame in order to manufacture the radiator frame according to an embodiment of the present invention.
Figure 7:
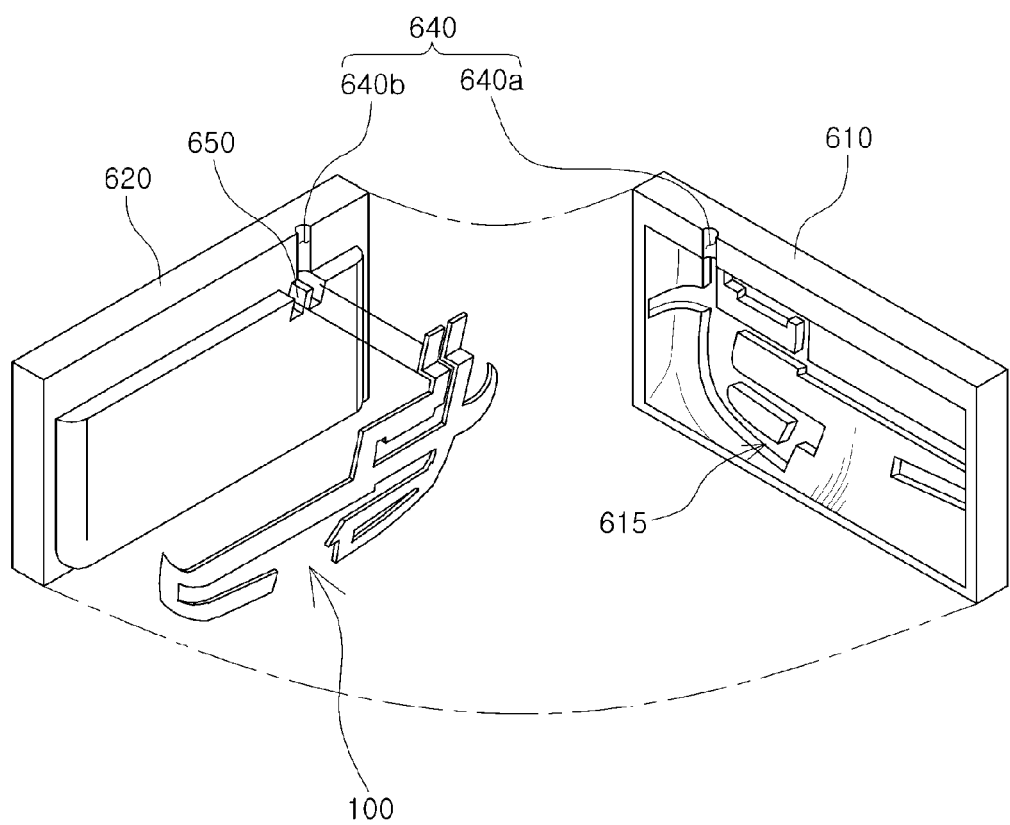
FIG. 7 is an exploded perspective view schematically showing a form in which the radiator is disposed in the mold for manufacturing the radiator frame in order to manufacture the radiator frame according to an embodiment of the present invention.

FIG. 4 is a perspective view schematically illustrating the radiator frame according to an embodiment of the present invention, FIG. 5 is a schematic cross-sectional view taken along line A-A' of FIG. 4, FIG. 6 is a cross-sectional view schematically illustrating a form in which a resin material is filled in a mold for manufacturing the radiator frame in order to manufacture the radiator frame according to an embodiment of the present invention, and FIG. 7 is an exploded perspective view schematically illustrating a form in which the radiator is disposed in the mold for manufacturing the radiator frame in order to manufacture the radiator frame according to an embodiment of the present invention.

Referring to FIGS. 4 and 5, the radiator frame 200 according to the embodiment of the present invention may include the radiator 100 and the molded frame 210.

Here, the configuration of the radiator 100 has been described in detail. Therefore, the description thereof will be omitted.

The molded frame 210 may be manufactured by injection-molding the radiator 100 and the terminal connection portion 130 may be provided so as to have elasticity. That is, when the injection-molding of the radiator 100 is complete, the terminal connection portion 130 is rotationally bent so as to be spaced apart from the molded frame 210. Thereby, since the radiator 100 is provided as an elastic body, the terminal connection portion 130 may naturally have elasticity. Besides, the structure for reinforcing the elastic force has been described in detail. Therefore, the description thereof will be omitted.

The molded frame 210 is an injection molding structure, the antenna pattern part 110 may be formed on the one surface 210a of the molded frame 210, and the terminal connection portion 130 may be formed on the other surface 210b opposite to the one surface 210a.

Here, the molded frame 210 may be provided so that a portion having the antenna pattern part 110 is further protruded in a direction of the one surface 210a as opposed to directions of other portions. That is, the one surface 210a of the molded frame 210 may be provided so as to have a form stepped in a direction of the other surface 210b, from a portion having the antenna pattern part 110 to other portions. As a result, the portion having the antenna pattern part 110 in the radiator frame 200 may be provided so as to be further protruded in the direction of the one surface 210a as opposed to directions of other portions.

The molded frame 210 may allow the antenna pattern frame 300 to be manufactured by attaching the one surface 210a having the antenna pattern part 110 formed thereon into the cover frame 250 to embed the antenna pattern in the cover frame 250 or by injection-molding the radiator frame 200.

A radiator supporting part 220 formed integrally with the molded frame 210 will be described in connection with a mold for manufacturing a radiator frame and a method thereof described below.

Referring to FIGS. 6 and 7, the radiator frame 200 according to the embodiment of the present invention may be manufactured by inserting the radiator 100 into an internal space 630 of the mold 600 for manufacturing the radiator frame and then injecting the molding resin into the internal space 630.

That is, the radiator 100 having the antenna pattern part 110 for transmitting or receiving the signal and the connecting terminal part 130 for transmitting or receiving the signal to or from the circuit substrate 500 of the electronic device disposed on different planes thereof, is disposed in the internal space 630 of the mold 600 for manufacturing the antenna pattern frame.

In this case, the mold 600 for manufacturing the antenna pattern frame may have the internal space 630 in which the radiator 100 is received, wherein the internal space 630 may be generated when upper and lower molds 610 and 620 of the mold 600 for manufacturing the antenna pattern frame are combined.

That is, the internal space 630 is formed when the upper mold 610 and the lower mold 620 are combined, and a groove formed in the upper mold 610 or the lower mold 620, that is, an internal surface may become the internal space 630 by the combination of the upper mold 610 and the lower mold 620.

In this case, the internal surface of the upper mold 610 forming the mold 600 for manufacturing the antenna pattern frame may be provided with an insertion groove 615 into which the antenna pattern part 110 of the radiator 100 is inserted. That is, the internal surface of the upper mold 610 is provided with the insertion groove 615 corresponding to a form of the antenna pattern part 110, such that the antenna pattern part 110 may be fixedly fitted into the insertion groove 615. Here, the insertion groove 615 may have a depth greater than a thickness of the antenna pattern part 110. That is, an overall thickness of the antenna pattern part 110 may be fitted into the insertion groove 615. The radiator frame 200 formed by injecting the molding resin by the configuration as described above may have a portion having the antenna pattern part 110, to be protruded to one surface as opposed to directions of other portions.

In addition, in the case in which the insertion groove 615 is provided in the upper mold 610, since a unit fixing the antenna pattern part 110 may not be provided, the injection-molding of the radiator 100 may be easily performed.

In addition, when the upper and lower molds 610 and 620 are combined, in order for resin material to be introduced into the internal space 630, a resin material injection part 640 may be formed by a combination of any one or both of the upper mold, the lower mold, or the upper and lower molds 610 and 620.

In addition, the internal surfaces of the upper and lower molds 610 and 620 may provide a receiving groove 650 receiving the connection part 120 and the terminal connection portion 130 of the radiator 100 and the receiving groove 650 may be introduced with the resin material to fixedly support the connection part 120 and the terminal connection portion 130.

That is, since one side surface of the connection part 120 contacts one side surface of the receiving groove 650, the resin material is filled only on one side surface of the connection part 120 to thereby form a radiator supporting part 220.

Here, the radiator supporting part 220 formed by the resin material introduced into the receiving groove 650 may be protruded from the other surface opposite to one surface on which the antenna pattern part 110 is formed.

Figure 8:
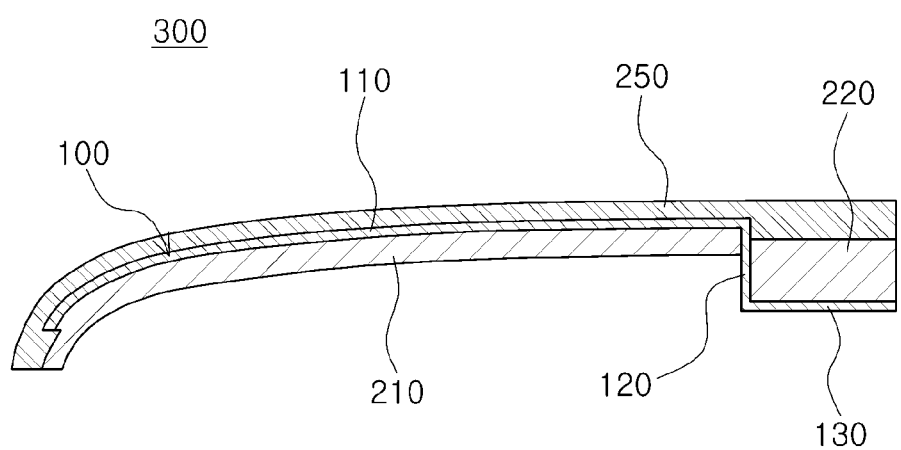
FIG. 8 is a schematic cross-sectional view taken along line A-A' of FIG. 4 of the antenna pattern frame having the antenna radiator embedded therein according to the embodiment of the present invention.
Figure 9:
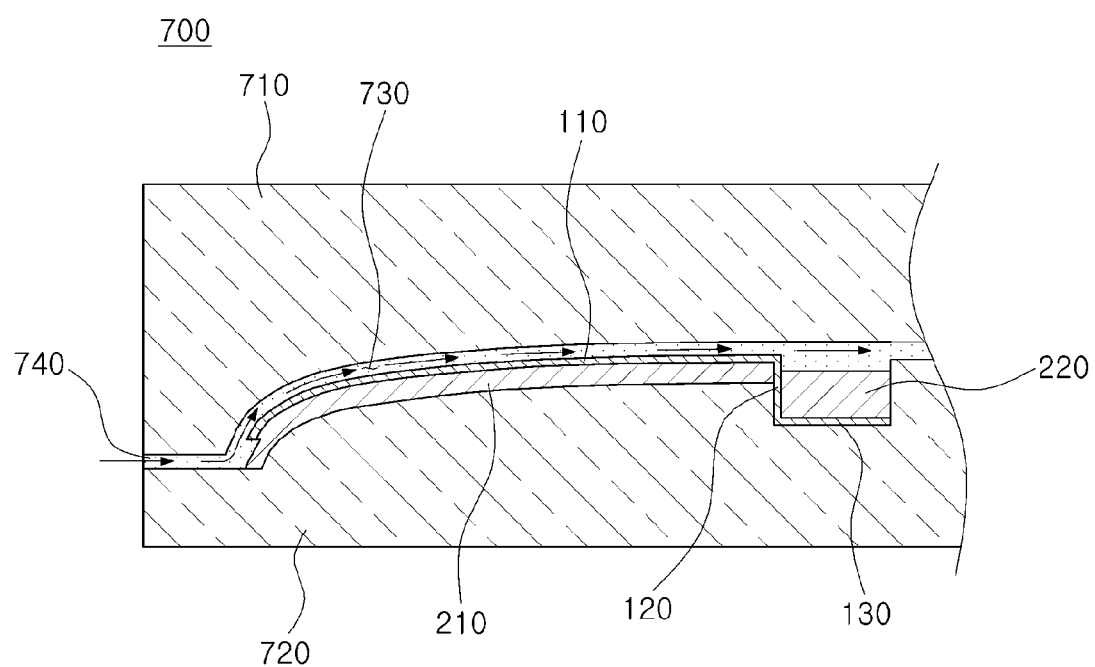
FIG. 9 is a cross-sectional view schematically showing a form in which a resin material is filled in a mold for manufacturing an antenna pattern frame in order to manufacture the antenna pattern frame having the antenna radiator embedded therein according to an embodiment of the present invention.

Antenna Pattern Frame Having Antenna Pattern Embedded Therein, Mold for Manufacturing Thereof, and Method of Manufacturing Thereof FIG. 8 is a schematic cross-sectional view taken along line A-A' of FIG. 4 of the antenna pattern frame having the antenna radiator embedded therein according to the embodiment of the present invention and FIG. 9 is a cross-sectional view schematically illustrating a form in which a resin material is filled into a mold for manufacturing an antenna pattern frame in order to manufacture the antenna pattern frame having the antenna radiator embedded therein according to an embodiment of the present invention.

Referring to FIGS. 8 and 9, the antenna pattern frame 300 having the antenna pattern embedded therein may include a radiator frame 200 and a cover frame 250.

The cover frame 250 may be provided by a separate injection molding product having a radiator receiving groove of a form corresponding to the radiator frame 200, and the antenna pattern frame 300 having the antenna pattern embedded therein may be manufactured by attaching the radiator frame 200 to the radiator receiving groove.

In addition, the method of manufacturing the antenna pattern frame 300 having the antenna pattern embedded therein according to the embodiment of the present invention may be performed to manufacture the antenna pattern frame 300 by disposing the radiator frame 200 integrating the radiator 100 and the molded frame 210 with each other in a mold 700 for manufacturing an antenna pattern frame, having an internal space formed therein, and introducing the resin material to integrate the radiator frame 200 with the cover frame 250 formed by curing the introduced resin material.

Here, a resin material injection part 740 may be included. The resin material injection part 740 may be formed in an upper mold, a lower mold, or the upper and lower molds 710 and 720 of the mold for manufacturing the antenna pattern frame, receiving the radiator frame 200 having the radiator 100, and may allow the resin material to be introduced into an internal space 730 formed in the mold when the upper and lower molds 710 and 720 are combined.

In the case in which the resin material is injected through the resin material injection part 740, since a portion having the antenna pattern part 110 in the radiator frame 200 is positioned to be in close proximity to the internal surface of the upper mold 710, the antenna pattern frame 300, a final product may have a reduced thickness. Of course, since a portion having no the antenna pattern part 110 in the radiator frame 200 is spaced apart from the internal surface of the upper mold 710 by a sufficient distance, the antenna pattern frame 300, the final product may be formed so as to have a sufficient thickness. Therefore, although the antenna pattern frame 300 having the reduced thickness is provided with the portion having the antenna pattern part 110, the antenna pattern frame 300 having the sufficient thickness is formed as a surrounding part. As a result, in the case in which the antenna pattern frame 300 is mounted on the electronic device, although the antenna pattern frame 300 configures the outermost surface, there is no problem in terms of strength or an exterior design.

Through the processes described above, the radiator frame 200 and the cover frame 250 are integrated with each other, such that the antenna pattern frame 300 having the antenna pattern embedded therein may be formed.

In addition, the antenna pattern frame 300 is mounted on the electronic device such as the mobile communication terminal 400, wherein an external surface of the antenna pattern frame 300 may be additionally covered with a film. More specifically, an external surface of the cover frame 250 externally exposed from the antenna pattern frame 300 may be additionally covered with the film. This is to consider an appearance design in the case in which the antenna pattern frame 300 is externally exposed. For example, the film may be formed immediately by spraying liquid for coating, painting, or the like, or may be simply formed by attaching ready-made article such as the film, a coating paper, or the like.

As set forth above, according to the embodiment of the present invention, the method capable of embedding an antenna radiator in a case of an electronic device while allowing a form thereof to be maintained without deformations of the antenna radiator itself, such as holes or the like, may be provided.

In addition, the radiator frame and the antenna pattern frame manufactured by the method as above may not have defects such as depressions or the like formed in the exterior.

In addition, according to the embodiment of the present invention, the antenna pattern part may be molded to be partialized from the internal part of the antenna pattern frame outwardly thereof so that the antenna pattern part may significantly exhibit performance of the radiator.

In addition, according to the embodiment of the present invention, since the antenna pattern frame may be mounted in the case of the electronic device by separately manufacturing the antenna pattern frame from the case of the electronic device, the antenna pattern frame may be re-used even in the case that defects are generated during the manufacturing of the case.

While the present invention has been shown and described in connection with the embodiments, it will be apparent to those skilled in the art that modifications and variations can be made without departing from the spirit and scope of the invention as defined by the appended claims.

What is claimed is:

1. An antenna pattern frame, comprising:
   a radiator including an antenna pattern part configured to transmit or receive a signal and a terminal connection portion configured to electrically connect the antenna pattern part and a circuit substrate;
   a radiator frame formed by injection-molding to incorporate the radiator so that the terminal connection portion is exposed at a first surface of the radiator frame and the antenna pattern part is exposed at and protrudes from a second surface of the radiator frame opposite to the first surface; and
   a cover frame injection-molded to incorporate the radiator so that the antenna pattern part is embedded between the radiator frame and the cover frame.

2. The antenna pattern frame of claim 1, wherein a thickness of the cover frame from an outer surface thereof to the antenna pattern part is less than that of the cover frame from an outer surface thereof to the radiator frame other than the portion having the antenna pattern part.

3. The antenna pattern frame of claim 1, wherein a thickness of the cover frame from an outer surface thereof to the radiator frame other than the portion having the antenna pattern part is the same as a thickness of the radiator frame other than the portion having the antenna pattern part.

4. The antenna pattern frame of claim 1, wherein the second surface of the radiator frame is stepped in a direction of the first surface, from a portion having the antenna pattern part to other portions of the radiator frame.

5. The antenna pattern frame of claim 1, wherein the first surface of the cover frame is stepped in a direction of the second surface from portions other than the portion having the antenna pattern part to the portion having the antenna pattern part.

6. The antenna pattern frame of claim 1, wherein the second surface of the cover frame is covered with a film formed by performing coating or painting, or attaching a film or a coating paper.

7. An electronic device, comprising:
   a case of the electronic device;
   the antenna pattern frame of claim 1 mounted to the case of the electronic device; and
   a circuit substrate electrically connected to the terminal connection portion to receive or transmit a signal from or to the radiator.

\* \* \* \* \*